W. H. MORRIS.
Improvement in Baling-Presses.

No. 130,524. Patented Aug. 13, 1872.

Witnesses:
Inventor:

UNITED STATES PATENT OFFICE.

WILLIAM H. MORRIS, OF TROY, TENNESSEE, ASSIGNOR TO HIMSELF AND MICHAEL BRIGHT, OF SAME PLACE.

IMPROVEMENT IN BALING-PRESSES.

Specification forming part of Letters Patent No. 130,524, dated August 13, 1872.

Specification describing a Horizontal Press for Hay or Cotton, invented by WILLIAM H. MORRIS, of Troy, in the county of Obion and State of Tennessee.

The invention consists in combining the sweep of a horizontal press-follower with a pivoted rod, and with the hinged door of the press-box and the operating windlasses, as more fully described hereafter.

Figure 1:
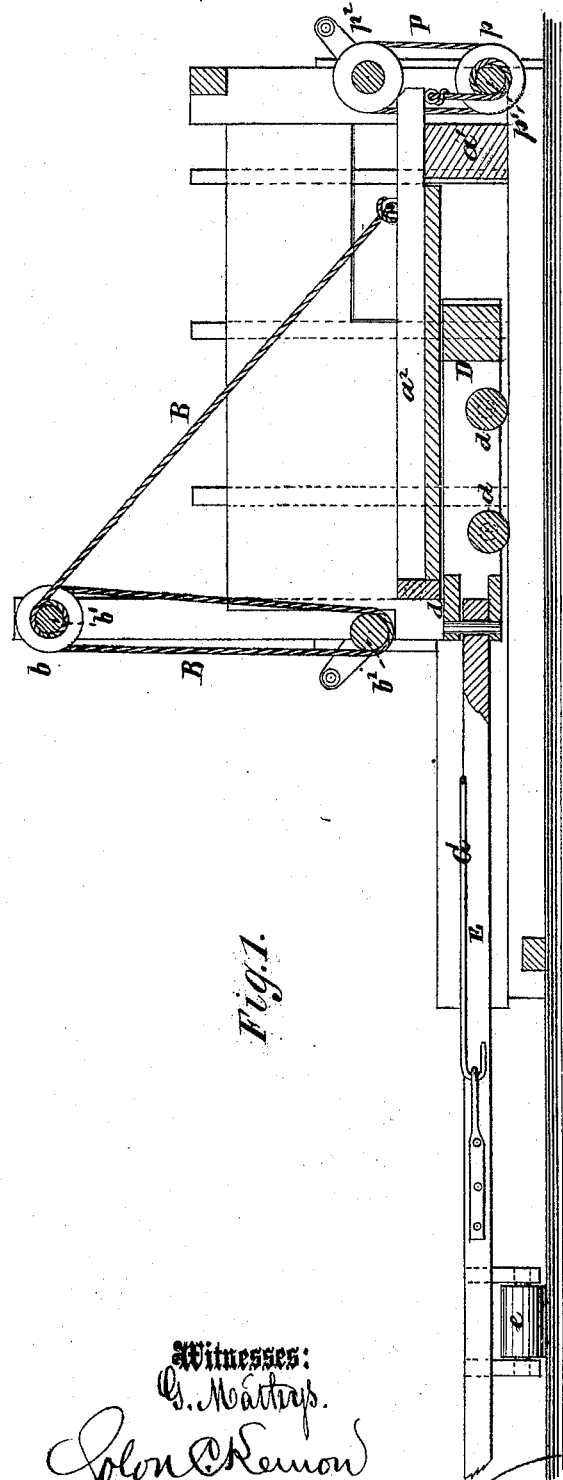
Figure 2:
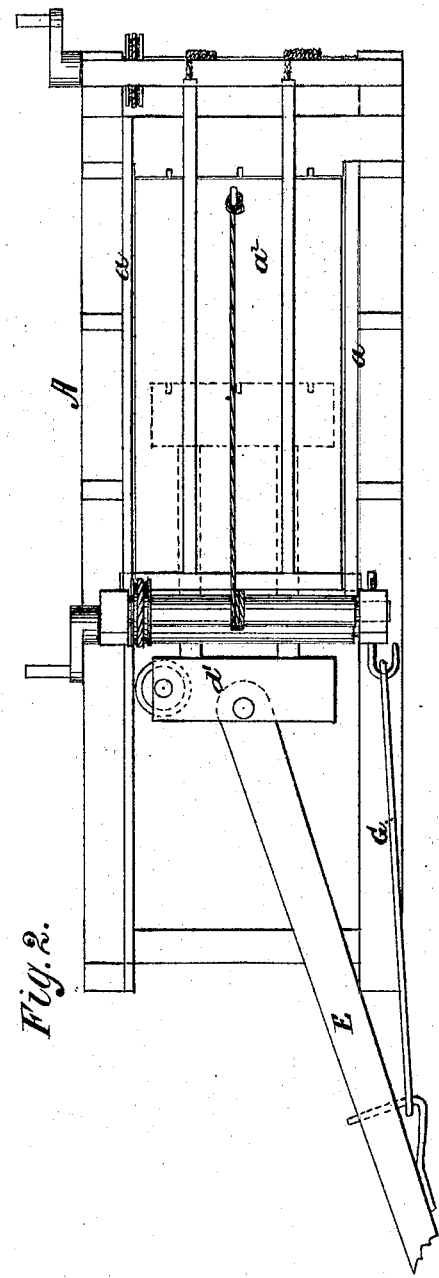

In the drawing, Figure 1 is a vertical longitudinal section. Fig. 2 is a top view.

A represents the press-box having sides $a$ $a$, with door in one or both of them, abutment $a^1$, against which the follower acts, and hinged cover $a^2$. C is the press-bottom, having hinged door under the pressed bale to allow it to drop from the machine. The hinged cover is raised by means of rope B, pulleys $b$ on shaft $b^1$, and windlass $b^2$, and it is forced down upon the hay or cotton by rope P, pulleys $p$ on shaft $p^1$, and windlass $p^2$. D is the follower, which moves on friction-rolls $d$, and is reciprocated by means of the lever E pivoted thereto at $d'$. This lever, in moving the follower inward, draws against the bar G pivoted to one side. The lever E has roll $e$, upon which it moves and is held at the desired height. The hinged lever being fastened down upon the inserted hay or cotton the follower is moved by horse, mule, or other power acting on lever E to the limit of its throw, when the pressed bale becomes shaped and the bottom door is swung down to admit its exit from the machine.

Having thus described my invention, what I claim as new, and desire to secure by Letters Patent, is—

1. The hinged door of press raised and depressed by windlasses, arranged as described.

2. In combination with the subject-matter of the foregoing claim, the follower D, sweep E, and pivoted bar G, as and for the purpose described.

W. H. MORRIS.

Witnesses:
   SOLON C. KEMON,
   THOS. D. D. OURAND.